R. R. SIGSBEE.
CHECK.
APPLICATION FILED AUG. 31, 1915.

1,186,047.

Patented June 6, 1916.

Inventor
Ross R. Sigsbee

By T. R. A. Bryant
Attorney

UNITED STATES PATENT OFFICE.

ROSS R. SIGSBEE, OF NEW YORK, N. Y.

CHECK.

1,186,047. Specification of Letters Patent. Patented June 6, 1916.

Application filed August 31, 1915. Serial No. 48,192.

*To all whom it may concern:*

Be it known that I, Ross R. Sigsbee, a citizen of the United States of America, residing at New York, in the county of New York and State of New York, have invented certain new and useful Improvements in Checks, of which the following is a specification.

This invention relates to checks to be used in business, such as is ordinarily practised by merchants, the checks to be given to each cash purchaser at the time of sale or to such credit purchasers who promptly settle their bills, the checks further having certain values either at the store of the merchant or at a center point for the distribution of other goods than that which the merchant preferably handles.

More especially the invention embraces a check which may be used as the stub of an ordinary charge slip or the like and which, when presented at the store of the vender after proper cancellation will indicate a certain discount value bearing a percentage ratio to the value of the purchased goods or when presented elsewhere, as to a central distributing store, will indicate by the cancellation effected at the sale a certain other percentage ratio which will be equivalent to cash for the indicated amount in the purchase of such merchandise or accommodations as may be at the disposal of such central agency.

The particular design of the device is to provide a discount order on the merchant selling the goods and at the same time to also indicate an order on an association of merchants for a certain value of tickets, such as car tickets, theater tickets, train or other tickets as may be desired.

The principal object of the invention is to provide a check or stub of this description wherein one side will have certain percentage discount indications which may be cancelled by punching or the like, while the other side will have certain other indications correlated with the first which will be cancelled by the same cancellation that effects the cancellation of the discount order on the first side, the first side being referred to as the obverse and the second side as the reverse hereinafter.

With the above and other objects in view, the invention consists in general of certain novel details of construction and arrangements of parts hereinafter fully described, illustrated in the accompanying drawings, and specifically claimed.

Figure 1:
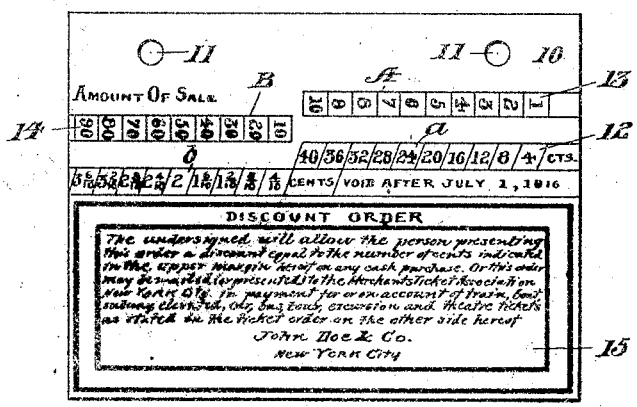
Figure 2:
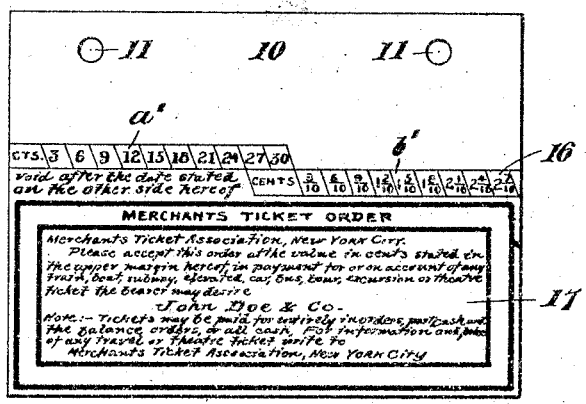

In the accompanying drawings, like characters of reference indicate like parts in the several views, and Figure 1 is a face view of the obverse side of a check constructed in accordance with this invention. Fig. 2 is a similar view of the reverse side of such check.

In carrying out the objects of the invention, there are provided for each merchant a series of checks preferably consisting of rectangular slips of paper or the like as indicated at 10. These checks are either bound up in pads in the ordinary manner or may be provided with perforations 11 for mounting them on a suitable holder. Each of these checks consists of an upper part whereon is provided on the obverse side a series of discount order indications as at 12 which are arranged opposite a series of purchase indications, the dollar indications being indicated at 13 while the cent indications are indicated at 14. Below these indications is a plaque 15 containing the instructions for the purchaser and a description of the value of such a check when presented to the merchant issuing the same.

On the reverse side of the check is a series of cash value indications 16 representing a value for which the check may be exchanged at a central agency for goods handled by such an agency. Below these indications is a plaque 17 explaining the utility of such reverse indications.

The indications 12 on the obverse side are so arranged with respect to the indications 16 on the reverse that when a purchase is made both the discount order and the order on the central agency will have their values clearly indicated, these values being different, by means of such cancellation as is effected by punching out the values opposite the purchase price indications. As an illustration of this let it be supposed that a person purchases six dollars and thirty cents worth of goods from a merchant. The merchant takes one of the checks and, with a suitable punch or other device which will mark on both sides of the paper at once punchings or markings opposite the figures indicated by A and B, these punchings or markings being formed in the parallelograms indicated at —*a*— and —*b*— respectively. These punchings or markings will also appear on the rear side at —a'— and —b'— respectively. In the present case, as illustrated in the drawings, a discount of four per cent. is allowed on the merchant, while the reverse calls for a ticket for which a cash equivalent of three per cent. is allowed. Then the six dollars and thirty cents will represent a discount on the purchaser's next order from the merchant of 25.2 cents while at the same time if he does not use the order with the merchant he may present the same at the central ticket distributing agency where it will be received as the equivalent of 18.9 cents toward the purchase of one or more tickets. Thus, the operation of canceling the discount value on the face or obverse of the check simultaneously effects the cancellation of the purchase value on the reverse of such check.

It is obvious that the particular discount and cash percentages illustrated in the present disclosure of the invention may be varied without departing from the principles involved and also that not only may discount and cash purchase values be used but either side of the check may be used for a different purpose than that disclosed, for instance, one side of such check may be used for cash purchases, at a certain percentage rate of discount while the other side may be used for credit purchases which are settled within a given time at a somewhat smaller percentage rate of discount. Many other variations will suggest themselves, all of which are within the scope of the present invention.

What is claimed as new is:—

1. A credit check having on one side indications of credit values at one rate per cent. and on the other side indications of credit values at a second rate per cent., said indications being disposed each opposite side of the check and in registration whereby cancellation from the check of an indication at one rate per cent. will simultaneously cancel a correlated indication at the second rate per cent., and purchase price indications spaced from and disposed in juxta-position to the credit value indications on one side of the check.

2. A credit check having on one side indications of credit values at one rate per cent. and on the other side indications of credit values at a second rate per cent., said indications being disposed each opposite side of the check and in registration whereby cancellation from the check of an indication at one rate per cent. will simultaneously cancel a correlated indication at the second rate per cent., and purchase price indications spaced from and disposed in juxta-position to the credit value indications on one side of the check, the indications on each side being superposed above a direction plaque giving directions for the use of the credit values on that side.

In testimony whereof I affix my signature.

ROSS R. SIGSBEE.